O. A. ROGERS.
ELECTRICAL CONNECTOR AND PROCESS OF MAKING SAME.
APPLICATION FILED OCT. 27, 1910.

1,078,751.

Patented Nov. 18, 1913.

Witnesses:

Inventor:

UNITED STATES PATENT OFFICE.

OWEN A. ROGERS, OF BERLIN, GERMANY, ASSIGNOR TO EDISON STORAGE BATTERY COMPANY, OF WEST ORANGE, NEW JERSEY, A CORPORATION OF NEW JERSEY.

ELECTRICAL CONNECTOR AND PROCESS OF MAKING SAME.

1,078,751. Specification of Letters Patent. Patented Nov. 18, 1913.

Application filed October 27, 1910. Serial No. 589,403.

*To all whom it may concern:*

Be it known that I, OWEN A. ROGERS, a citizen of the United States, and a resident of Berlin, Germany, have invented a certain new and useful Improvement in Electrical Connectors and Processes of Making Same, of which the following is a description.

My invention relates to electrical connectors and has for its object the construction of a connection which will be efficient and durable in operation, and easy to manufacture.

Although for purposes of illustration, I have disclosed my improvements as applied to storage batteries, it will be evident that it is not limited thereto, and may be used wherever a connection of this type is desired, or wherever it is desired to connect together two or more members or parts. As applied to storage batteries, my improvement is particularly efficient for connecting the poles of the different cells forming the battery, especially when the battery is to be used on vehicles, as the jolting to which such a battery is subjected necessitates a connection of great durability, and ability to maintain an efficient electrical contact under all conditions. In the embodiment disclosed, each battery pole has fitted thereon a lug or bushing with a suitable hole to receive said pole. This lug is provided with an extension having a socket therein to receive the connecting wire, said extension also having an opening or openings in the wall of the socket for a purpose to be hereinafter described. The end of the connecting wire is inserted in the socket and the extension compressed into close contact therewith. A groove, preferably annular, is also formed on the extension, the metal displaced thereby forming a similar groove in the inserted connecting wire, the metal displaced by the formation of the groove in the connecting wire being forced or squeezed into the opening or openings in the wall of the socket. The exterior of the opening is closed in any desired manner, thereby locking the squeezed out portion of the inserted wire within the extension. The members may be compressed in any desired manner as by a drop press having an annular bead of proper dimensions to perform the desired operation. The connection formed is not only particularly efficient from the standpoint of a perfect electrical connection, but also is very strong and durable for any purpose and comparatively inexpensive to manufacture.

Reference is made to the accompanying drawings wherein:—

Figures 4, 5:
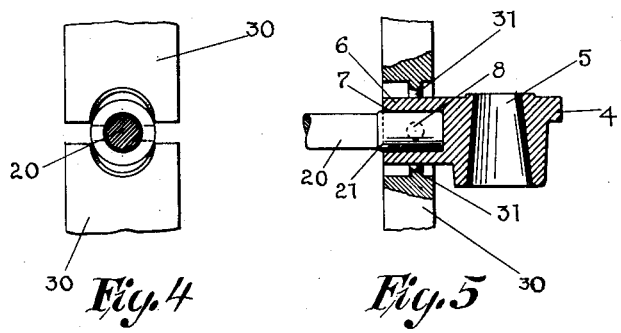
Figures 2, 3, 6, 7:
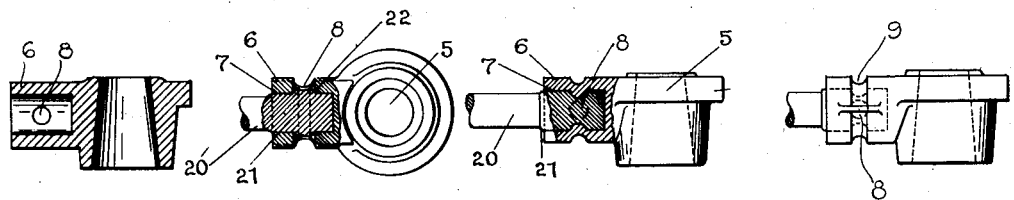
Figure 1:
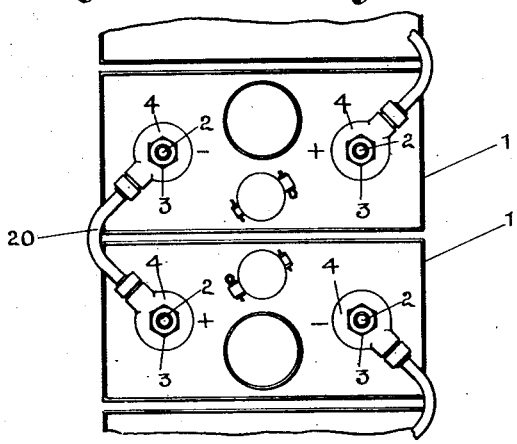

Figure 1 is a plan view of storage battery cells showing the connecting device applied to the poles thereof; Fig. 2 is a plan of the lug and connecting wire with parts cut away to show the squeezing of the connecting wire into openings provided therefor in the extension of the lug; Fig. 3 is a side elevation of the lug and connecting wire showing the groove formed in the extension of the lug by the press, and the manner in which the openings in the extension are closed; Fig. 4 is a section through the connecting wire looking in the direction of the lug and showing the press about to descend thereon; Fig. 5 is a vertical section of the lug showing the connecting wire in elevation, with the press about to descend thereon, having portions cut away to show the annular groove-forming bead on said press. Fig. 6 is a sectional view of the lug and the extension showing the socket and the opening leading therefrom; and Fig. 7 is a view of the lug and extension with the wire secured therein.

Similar reference numerals refer to similar parts throughout the drawings.

To illustrate my invention, I have shown it applied to storage battery cells connected in series, wherein—

1 indicates the cells of the battery, and 2 indicates the poles thereof to which the lug or bushing 4 is secured by any suitable device, as nuts 3. In the embodiment disclosed, the lug 4 is provided with a hole 5 to receive the pole of the battery, and with an extension 6 having a socket 7 therein. The extension is also provided with openings 8 of any desired number and of any desired shape for a purpose to be hereinafter described. The connecting wire in the embodiment disclosed consists of a portion 20 of any desired length, preferably having its end enlarged as at 21 to a size to make a good fit within the socket of the extension. After the wire is placed in the socket, preferably as far as it will go, the lug is placed in a press 30 having a bead 31, and the extension pressed into firm contact with the surface of the connecting wire, thereby forming an efficient electrical connection. At the same time, by means of its bead 31, the press forms an annular groove 9 in the surface of the extension. The metal displaced by the forming of this groove is forced into the connecting wire contained in the extension socket, thereby forming a similar shaped groove therein, and the metal displaced in turn from the connecting wire by the forming of its groove is squeezed out through the aforementioned openings 8 in the extension 6, as indicated by reference numeral 22 on Fig. 2 of the drawings. At the same time the outer surface of the extension adjacent the openings 8 is squeezed together, thereby closing the opening, as shown in Fig. 7, and locking the squeezed-out metal of the connecting wire within the extension and the openings.

It will be evident that the device resulting from this process has its parts in firm contact throughout, and that the same are locked together permanently and securely by the grooves formed therein, and by the squeezing of the connecting wire into the openings in the extension. This method may be used to secure any number of parts together, whether or not an electrical connection is desired. A lug having any desired number of sockets may be provided, or two parts may be secured together by this method without the use of a connecting lug, by properly shaping their contiguous ends.

Many modifications will be apparent to those skilled in the art, my invention not being limited to the particular process and article described, but consisting of a connection between two parts whereby they are, by a cheap and efficient process, secured together by compression in such a manner that an excellent contact is made therebetween and the two parts firmly secured together.

Having thus disclosed one embodiment of my invention, what I claim and desire to protect by Letters Patent is:

1. The process of securing members together, which consists in providing one of said members with a socket having openings therein, inserting the other member in said socket, and compressing the members to form a groove in the socket member, the metal displaced from said groove forming a groove in said inserted member, and the metal displaced by forming the groove in said inserted member being forced out through the openings in said socket member.

2. The process of securing members together which consists in providing one of said members with a socket having openings, inserting the other member in said socket, and compressing both members into firm contact, thereby forming a groove on the socket member, the metal displaced from said groove on the socket member forming a groove in said inserted member, the metal displaced by forming the groove on said inserted member being forced into the openings on the socket member, and the metal around the outside of said openings on the socket member being squeezed together to close said opening.

3. As an article of manufacture, a member provided with a socket and an opening, a member inserted in said socket, both members having grooves therein, the groove on the inserted member formed by the displaced metal of the groove on the socket member, and the metal displaced by the formation of the groove on the inserted member entering the opening of the socket member.

4. As an article of manufacture, a member provided with a socket and openings, another member inserted in said socket, a groove in said members, the displaced material formed by the groove in the socket member forming the groove on the inserted member, and the metal displaced by the formation of the groove on the inserted member entering the openings of the socket member, and the outside of said openings being closed.

5. The process of securing members together, which consists in providing one of said members with a socket having an opening therein, inserting the other member in said socket, and compressing the members to form a groove in the socket member, the metal displaced from said groove forming a groove in said inserted member, and the metal displaced by forming the groove in said inserted member being forced through the opening in said socket member.

This specification signed and witnessed this 11th day of October, 1910.

OWEN A. ROGERS.

In presence of—
  HENRY HASPER,
  WOLDEMAR HAUPT.